United States Patent [19]

Laws et al.

[11] Patent Number: 5,699,694

[45] Date of Patent: Dec. 23, 1997

[54] HEAT SHIELDS

[75] Inventors: William Robert Laws; Geoffrey Ronald Reed, both of Surrey, Great Britain

[73] Assignee: Encomech Engineering Services Ltd., Surrey, England

[21] Appl. No.: 651,487

[22] Filed: May 22, 1996

[30] Foreign Application Priority Data

May 26, 1995 [GB] United Kingdom ............. 9510740

[51] Int. Cl.[6] .................................................. B21B 27/06
[52] U.S. Cl. .................................................... 72/200
[58] Field of Search ................... 15/94; 72/200, 72/202, 39, 40

[56] References Cited

U.S. PATENT DOCUMENTS

| 4,343,168 | 8/1982 | Laws et al. . |
| 4,452,587 | 6/1984 | Laws et al. . |
| 4,463,585 | 8/1984 | Laws et al. . |
| 4,499,746 | 2/1985 | Laws et al. . |
| 4,719,779 | 1/1988 | Laws et al. . |
| 4,736,608 | 4/1988 | Laws et al. . |
| 5,033,926 | 7/1991 | Laws et al. . |

FOREIGN PATENT DOCUMENTS

| 0005340 | 11/1979 | European Pat. Off. . |
| 0059093 | 9/1982 | European Pat. Off. . |
| 0677337 | 10/1995 | European Pat. Off. . |

OTHER PUBLICATIONS

Iron and Steel Engineer, vol. 66, No. 12, 1 Dec. 1989, "Theory and design of reradiating type heat retention panels" by Ginzburg et al.

*Primary Examiner*—Lowell A. Larson
*Assistant Examiner*—Rodney Butler
*Attorney, Agent, or Firm*—Larson & Taylor

[57] ABSTRACT

Heat shield panels arranged below a hot material path are supported in a manner which allow limited movement. Carry-over bars at opposite ends of each panel are also displaceably mounted and have bearer elements which lie below the panels. When a carry-over bar is struck by distorted material, it will be momentarily displaced and, through supporting engagement of the bearer elements with the panel, displacement of the panel also occurs, so disturbing loose deposits on its top faces. Occasional agitation of the panels is thereby provided passively and the build-up of deposits on a panel top face can be countered in a manner which allow the angle of slope of the top faces to be reduced.

12 Claims, 3 Drawing Sheets

HEAT SHIELDS

BACKGROUND OF THE INVENTION

This invention relates to heat shield arrangements, for hot rolling mills for example, and to heat-insulating panels for such arrangements.

Heat shield arrangements are employed on roller tables to reduce heat loss from metal products such as slab, strip and bar, undergoing hot rolling. EP 005340 describes a form of heat shield arrangement comprises two series of heat insulating panels forming upper and lower layers above and below the roller table material path, the panels of the lower layer being located between successive rollers of the roller table. For efficiency of operation, each panel is of the re-radiating type having a relatively low thermal mass so that the panel hot face directed towards the material is heated rapidly to the temperature of the material.

It can be difficult to use re-radiating panels effectively in the lower layer of panels if the material being rolled is of a type that sheds deposits while it is on the roller table, as with the mill scale that falls from steel during hot rolling. The accumulation of such deposits will severely reduce the efficiency of the panels. For this reason it is known to incline the top faces of such panels, as is exemplified in EP 059093. Aided by the vibration of the roller table structure that occurs during normal use, material slides off the panel top faces by gravity. It is necessary to incline the top faces steeply, eg. at about 37° to the horizontal, to achieve this effect reliably. That brings its own penalty because it results in a part of each panel being substantially thinner and so less efficient as an insulator.

It has also been proposed to vibrate the lower panels of a heat shield arrangement by a motor drive to remove scale, but this involves additional equipment costs. Furthermore, the panels must be disturbed frequently to prevent blockages building up from the presence of larger pieces of scale, so the running and maintenance costs are significant.

SUMMARY OF THE INVENTION

According to one aspect of the present invention, a heat shield arrangement is provided for a roller table comprising a series of spaced rollers defining a path for hot material supported by the rollers, the arrangement comprising heat shield panels between successive rollers, top faces of the panels being directed towards said path and being inclined to the horizontal in order to permit particles deposited on them to slide off the panels, said panels being free to move relative to the roller table, members adjacent the panels projecting above said top faces of the panels and also being able to move relative to the roller table, said projecting members, when moved upwardly, being arranged to support and displace the panels, thereby to disturb the panels to assist the movement of particles resting on the panel top faces.

The projecting members will normally be positioned below the path of the hot material but if sufficiently close to that path to be contacted by minor deformities of the hot material passing along the roller table, the displaceability of the projecting members and the associated panels allows the panels to be readily disturbed to promote the movement of particles resting on the panel top faces.

By these means the additional costs and complications of mechanical vibration means are avoided, although any deposits on the panel can be sharply and frequently disturbed. As a result, it is possible to reduce the angle of inclination of the panel top faces, preferably to an angle not substantially more than 25° to the horizontal.

In a preferred arrangement the projecting members are held captive with a limited degree of freedom by a supporting structure of the roller table so as to maintain them in their locations. The panels can rest by gravity on said projecting members even when the roller table is inoperative, or they may rest on fixed supports when in the operative state, being supported and lifted by the projecting members when the latter are displaced.

The movement of both the projecting members and the panels can be limited by a fixed base structure on which they are mounted.

According to another aspect of the invention, there is provided, for use in a heat shield arrangement, a heat shield panel arranged to be disposed below a hot material path and protection means for the panel comprising a pair of members at opposite ends of the panel having lateral projections on which the panel can rest, said members being arranged to be movably mountable on a fixed support structure, in such a way that they project above the panel, the panel being so mounted that it is at least partially supported by said lateral projections when said members move upwards, whereby the panel is displaced with said members.

In a further aspect of the invention, a method is provided, for removing loose deposits from sloping top faces of heat shield panels arranged below the material path along a roller table of a hot rolling mill, in which the panels are supported through a fixed supporting structure below said path, comprising the steps of locating, below said material path, members which project above said panels to close to said path, holding both said projecting members and said panels displaceably, and utilizing said projecting members to provide support for the panels at least when they are displaced upwardly from a rest position, whereby agitation of the projecting members from time to time by material passing along said path will excite movement of the panels to shake loose deposits from said top faces.

By way of an example embodiments of the invention will be described in more detail with reference to the accompanying drawings.

DESCRIPTION OF THE PREFERRED EMBODIMENTS

Figure 1:
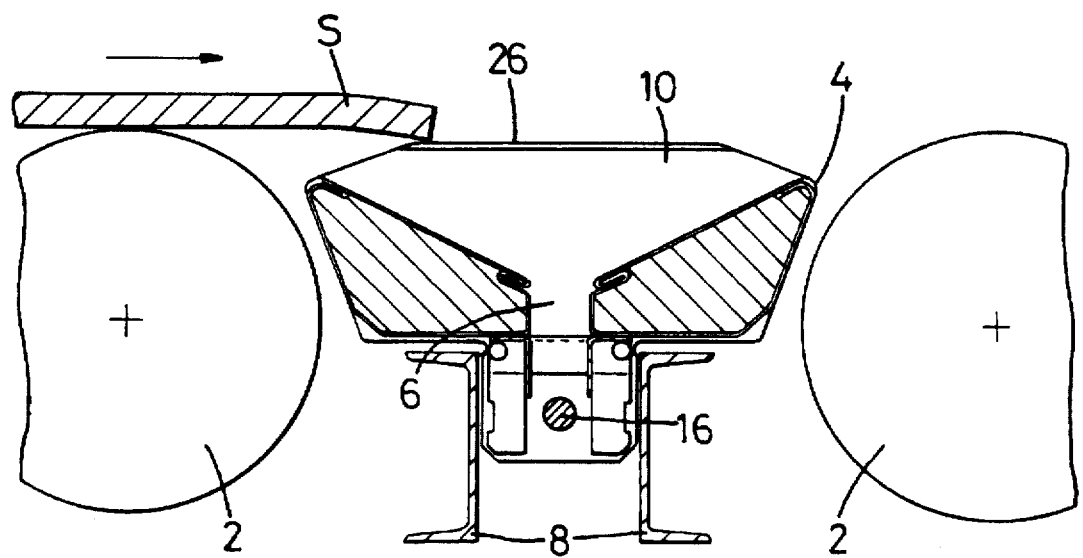
FIG. 1 is a vertical longitudinal section of a portion of a roller table illustrating a first embodiment of the invention.
Figure 2:
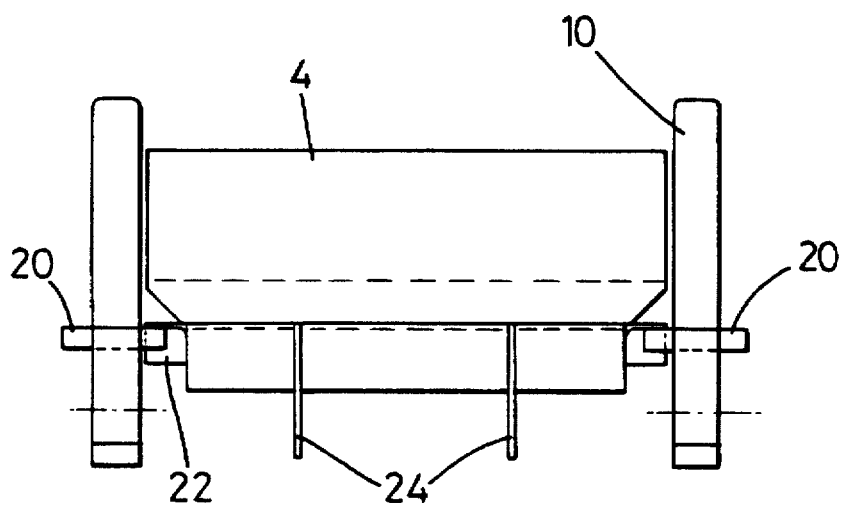
FIG. 2 is a front view of one heat shield panel and its associated carry-over bars.
Figure 3:
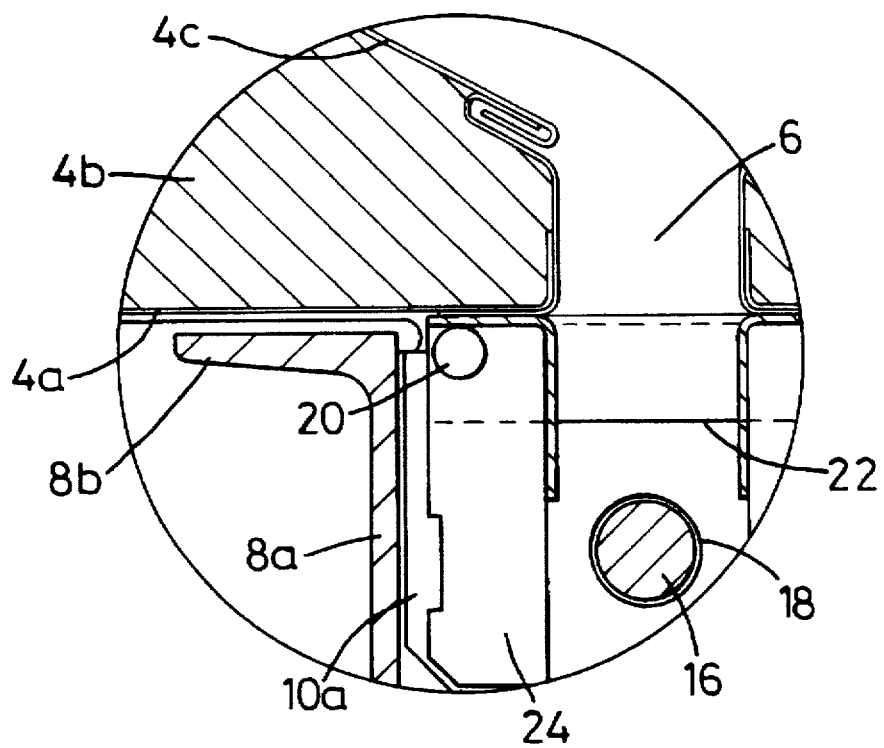
FIG. 3 is a sectional view to a larger scale showing a detail of the mounting of a heat shield panel.
Figure 4A:
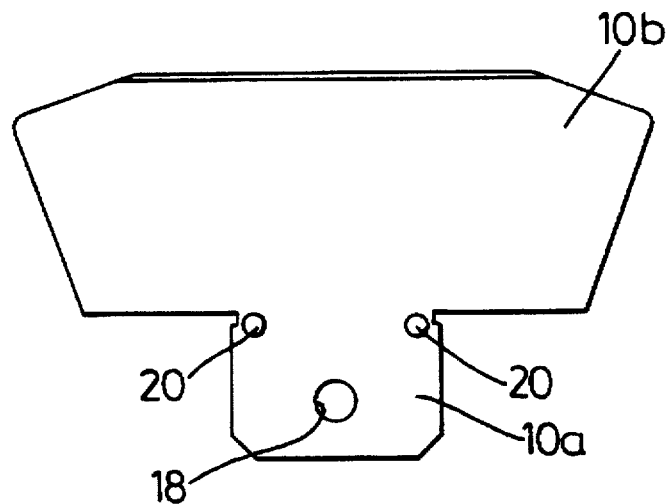
FIGS. 4a and 4b are mutually transverse views of a carry-over bar through which a panel is mounted on the supporting structure of the roller table.
Figure 4B:
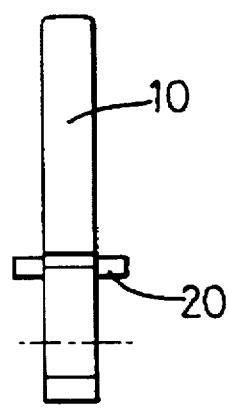

FIG. 1 of the drawings illustrates only one pair of rollers 2 of a roller table and one of a row of similar heat shield panels 4 between them which, with similar panels between each successive pair of rollers, forms a lower heat shield of the table along which hot metal sheet stock S is travelling.

The table will also be provided with a series of upper heat shield panels but these are not relevant to the present invention. The panels 4 are of a known re-radiating type such as is described in EP 005340 for example, having a thin-walled casing 4a enclosing a ceramic fibre insulating body 4b.

During the operation of the hot rolling mill in which the roller table is installed, scale and other foreign matter will fall from the stock being processed. The top face 4c of each panel are inclined in order to allow this loose material to slide off, through a slot 6 in the centre of the panel.

The panels are mounted in a supporting frame that forms part of the base of the roller table, FIG. 1 showing only a pair of transverse channel members 8 of the supporting frame that also carries the bearings (not shown) for the rollers. As illustrated, the panels 4 are located over respective pairs of the transverse channel members 8.

Each panel 4 of a row lies between a pair of carry-over bars 10 of identical form which carry the panels are themselves attached to the supporting frame. The carry-over bars 10 are intended to protect the panels from damage when deformed stock S projects below the pass line formed by the top tangent plane of the rollers.

Each carry-over bar 10 is attached to the supporting frame by a pin 16 mounted in members (not shown) of the frame extending between the two transverse channel members 8. The pin 16 passes through an oversize hole 18 in the carry-over bar, so that the bar has some limited freedom of movement with respect to the supporting frame. This freedom is further limited by the webs 8a of the transverse channel members, which lie close to the lower portions 10a of the carry-over bars, but it is to be noted that, in contrast to conventional heat shield arrangements, the bars are not firmly fixed to the supporting frame.

Dowel pins 20 project from the carry-over bars 10 and the panels 4 have channels or pockets 22 formed on their undersides in which the pins fit loosely. Each panel rests freely on the dowel pins of the carry over-bars at its opposite ends in a manner which allows the panel some freedom of movement relative to the bars. The panels also have downwardly projecting webs 24 that lie close to the channel webs 8a, but at a greater clearance than the lower portions 10a of the carry-over bars. The panels are therefore capable of greater horizontal freedom of movement than the carry-over bars in direction of travel of the stock S.

When resting on its pin 16, the top edge 26 of each carry-over bar 10 is approximately 25 to 40 mm below the pass line of the roller table and the limbs of the main part 10b of the bar are spaced above the flanges 8b of the channel sections. The top of each panel lies below the top edge of the carry-over bars.

In the use of the arrangement, if the stock being rolled were truly planar it would pass clear of the bars, but the rolling process typically produces small deformations at the head and tail ends of the stock, as already indicated. Because of these deformations and other possible imperfections, the carry-over bars 10 will often be struck by the stock as it moves along the roller table, in the manner shown in FIG. 1. When this happens, the bars will be rocked, because of the freedom of movement they have been allowed. The shock load will be transmitted directly to the supporting frame, but because of the rocking of the carry-over bars a shaking movement is transmitted to the panels 4 through the dowel pins 20. These move in their turn, possibly more than the bars, and loose scale and the like which has fallen onto the panels is therefore vigorously disturbed to slide through the slots 6.

Figure 5:
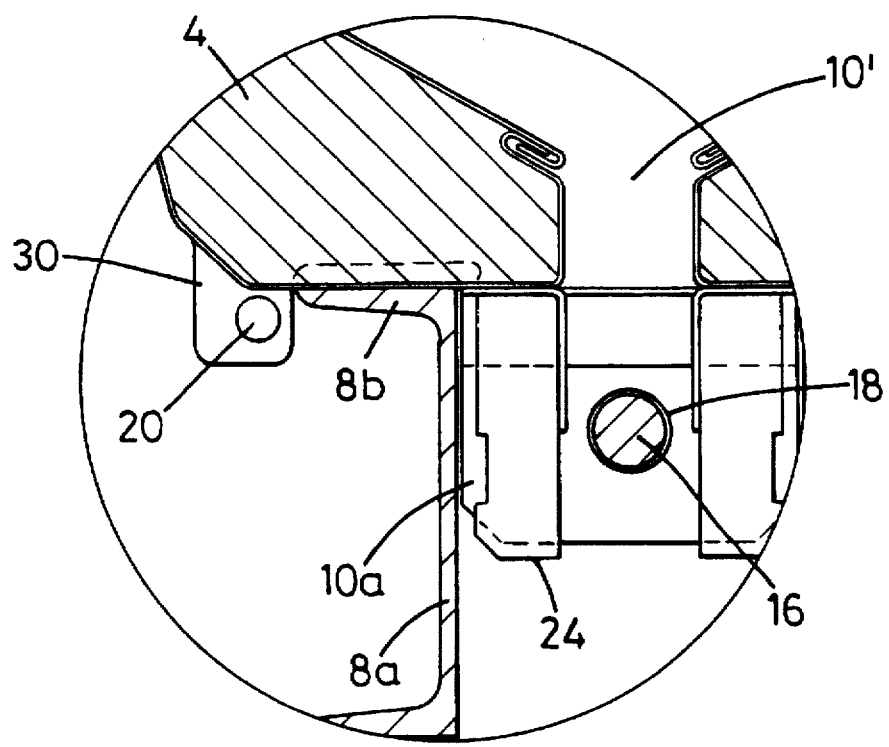
FIG. 5 is a view, similar to FIG. 3, illustrating a modification of the first embodiment.
Figure 6:
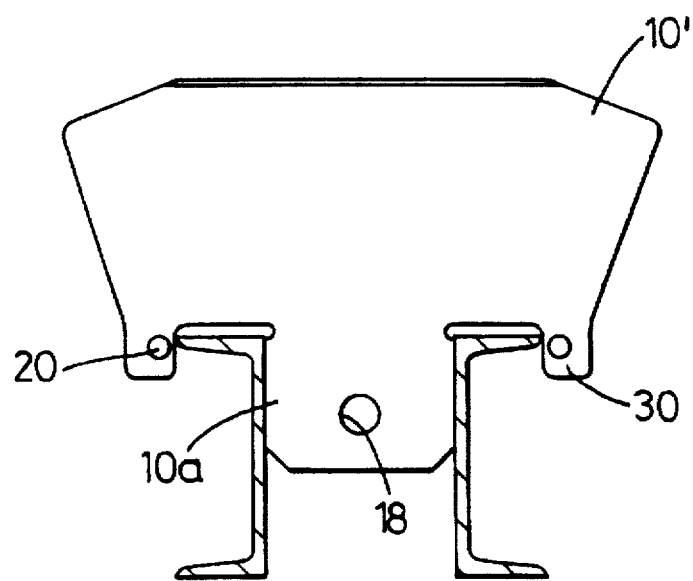
FIG. 6 is a view, similar to FIG. 4a, of the carry over bar in FIG. 6.

In the modified arrangement shown in FIGS. 5 and 6, parts already described are indicated by the same reference numbers. The carry-over bars 10' are similar to those shown in the first embodiment but now have lobes 30 extending from their bottom end in which the dowel pins 20 are fixed. In the rest position illustrated there is a small clearance between the bottom face of the panel and the dowel pins. As a result, the associated panel now rests on the channel members 8 of the fixed supporting frame until the carry-over bars 10' are disturbed. This arrangement operates in the manner already described. When a carry-over bar is disturbed and is lifted, the dowel pins 20 lift and support the panel, so that, as in the first example, the movement of the carry-over bar agitates the panel and disturbs foreign matter on its upper face.

It is found that the arrangements described can be operated effectively with the panel top faces 4c inclined no more than about 25° to the horizontal. This compares with an angle of about 37° for a conventional arrangement. With the limited space that is available below the pass line of a roller table, it is therefore possible to have an increased amount of thermal insulation in the panels, so improving the efficiency of the lower layer of the heat shield arrangement.

We claim:

1. A heat shield arrangement for a roller table comprising a series of spaced rollers, a material path defined on said table for hot material supported by the rollers, heat shield panels movably supported between successive rollers, said panels having top faces of said panels directed towards said material path and being inclined to the horizontal in order to permit particles deposited on them to slide off the panels, members adjacent the panels projecting above said top faces of the panels, mounting means supporting said members with limited freedom of movement relative to said mounting means, said panels being at least partially supported by said projecting members at least when said members are moved upwardly relative to the mounting means, in order to thereby disturb the panels to assist the movement of particles resting on the panel top faces.

2. A heat shield arrangement according to claim 1 wherein said top faces are inclined at not substantially more than 25° to the horizontal.

3. A heat shield arrangement according to claim 1 comprising means holding said projecting members captive to maintain them displaceably in their locations.

4. A heat shield arrangement according to claim 1 comprising means holding said panels captive to maintain them displaceably in their locations relative to the roller table.

5. A heat shield arrangement according to claim 1 wherein the panels are movable in the direction of the material path.

6. A heat shield arrangement according to claim 1 wherein the panels are supported on said projecting members when said members are in a state of rest.

7. A heat shield arrangement according to claim 1 wherein a supporting structure of the roller table provides a static support on which the panels rest when not displaced by upward movement of said projecting members.

8. A heat shield arrangement according to claim 5 wherein the panels have a greater freedom of movement in the direction of the material path than the projecting members.

9. For use in a heat shield arrangement, a heat shield panel to be disposed below a hot material path said panel having opposite ends laterally spaced apart relative to said path, protection means for said panel comprising a pair of members at said opposite ends of the panel, lateral projections extending from said members on which the panel can rest, said members being arranged to be movably mountable on a fixed support structure in such a way that they project above the panel, the panel being so mounted that it is at least partially supported by said lateral projections when said members move upwards, whereby the panel is displaced with said members.

10. A method of removing loose deposits from sloping top faces of heat shield panels arranged below the material path along a roller table of a hot rolling mill, a fixed supporting structure supporting the panels below said path, the method comprising the steps of locating, below said material path, members which project above said panels to close to said path, holding both said projecting members and said panels displaceably, and utilizing said projecting members to provide support for the panels at least when they are displaced upwardly from a rest position, whereby agitation of the projecting members from time to time by material passing along said path will excite movement of the panels to shake loose deposits from said top faces.

11. A method according to claim 10 wherein the panels rest on said projecting members when said members are in a non-displaced state.

12. A method according to claim 10 wherein the panels rest on the fixed supporting means when not displaced by said projecting members.

* * * * *